(12) United States Patent
Lee et al.

(10) Patent No.: US 12,451,609 B2
(45) Date of Patent: Oct. 21, 2025

(54) WAVEGUIDE ANTENNA AND RADAR APPARATUS INCLUDING THE SAME

(71) Applicant: BITSENSING INC., Seoul (KR)

(72) Inventors: Jae Eun Lee, Seoul (KR); Hae Seung Lim, Seongnam-si (KR); Su Han Kim, Yongin-si (KR)

(73) Assignee: BITSENSING INC., Seoul (KR)

( * ) Notice: Subject to any disclaimer, the term of this patent is extended or adjusted under 35 U.S.C. 154(b) by 335 days.

(21) Appl. No.: 18/089,246

(22) Filed: Dec. 27, 2022

(65) Prior Publication Data

US 2024/0204413 A1   Jun. 20, 2024

(30) Foreign Application Priority Data

Dec. 14, 2022  (KR) .......................... 10-2022-0174409

(51) Int. Cl.
*H01Q 13/10* (2006.01)
*G01S 13/931* (2020.01)
(Continued)

(52) U.S. Cl.
CPC .......... *H01Q 13/10* (2013.01); *G01S 13/931* (2013.01); *H01Q 1/12* (2013.01); *H01Q 1/32* (2013.01);
(Continued)

(58) Field of Classification Search
CPC . H01Q 13/10; H01Q 1/12; H01Q 1/32; G01S 13/931; G01S 2013/93274; G01S 2013/93272
See application file for complete search history.

(56) References Cited

U.S. PATENT DOCUMENTS

| | | |
|---|---|---|
| 7,583,074 B1 | 9/2009 | Lynch et al. |
| 2002/0003502 A1 | 1/2002 | Falk |

(Continued)

FOREIGN PATENT DOCUMENTS

| | | | |
|---|---|---|---|
| CN | 202737096 U | * | 2/2013 |
| CN | 106256043 A | | 12/2016 |

OTHER PUBLICATIONS

Y. Chen and R. G. Vaughan, "Slot antenna array on triangular waveguide," 2015 IEEE International Symposium on Antennas and Propagation & USNC/URSI National Radio Science Meeting, Vancouver, BC, Canada, 2015, pp. 206-207 (Year: 2015).*

(Continued)

*Primary Examiner* — Robert W Hodge
*Assistant Examiner* — Bongani Jabulani Mashele
(74) *Attorney, Agent, or Firm* — Dinsmore & Shohl LLP; Yongsok Choi, Esq.

(57) ABSTRACT

A waveguide antenna includes a base part including an accommodation portion that accommodates an integrated circuit and configured to separate an output of the integrated circuit into a first electromagnetic wave and a second electromagnetic wave having different frequencies from each other; a waveguide part provided on the base part and including a first waveguide and a second waveguide that guide the first electromagnetic wave and the second electromagnetic wave in different directions; and a cover part provided to cover at least a part of the waveguide part and including a first directional surface to which the first electromagnetic wave is radiated and a second directional surface to which the second electromagnetic wave is radiated.

11 Claims, 9 Drawing Sheets

(51) Int. Cl.
*H01Q 1/12* (2006.01)
*H01Q 1/32* (2006.01)
(52) U.S. Cl.
CPC .............. *G01S 2013/93272* (2020.01); *G01S 2013/93274* (2020.01)

(56) References Cited

U.S. PATENT DOCUMENTS

2004/0100405 A1* 5/2004 Mohamadi ........... H01Q 21/065
343/700 MS
2017/0047649 A1* 2/2017 Himmelstoss ......... H01Q 13/06
2021/0239822 A1* 8/2021 Vollbracht ............ G01S 13/426

OTHER PUBLICATIONS

Extended European Search Report for EP application No. 22216776.9 dated Aug. 23, 2023.

* cited by examiner

WAVEGUIDE ANTENNA AND RADAR APPARATUS INCLUDING THE SAME

CROSS-REFERENCE TO RELATED APPLICATION

This application claims the benefit under 35 USC 119(a) of Korean Patent Applications No. 10-2022-0174409 filed on Dec. 14, 2022 in the Korean Intellectual Property Office, the entire disclosures of which are incorporated herein by reference for all purposes.

TECHNICAL FIELD

The present disclosure relates to a waveguide antenna and a radar apparatus including the same.

BACKGROUND

Omnidirectional (360°) monitoring around a vehicle is an essential requirement for advancing ADAS (Advanced Driver Assistance Systems) and securing high-level autonomous driving solutions.

FIG. 1 is a diagram illustrating a conventional radar system mounted on a vehicle for omnidirectional monitoring. Referring to FIG. 1, the vehicle is equipped with radars capable of wide-angle monitoring on the four front and rear corners and may be further equipped with a front radar depending on the level of autonomous driving.

However, the illustrated vehicle equipped with radars on the four corners has blind zones on the sides (for example, around B-pillars). In this case, an additional radar needs to be mounted on the vehicle in order to perform lateral recognition and response, which results in an increase in cost caused by an increase in number of sensors, securing of a mounting space and cable configuration and also degrades the aesthetic appearance of the vehicle.

Further, in order to minimize the blind zones on the sides, each radar mounted on the corner may be provided such that the boresight direction of its antenna is set to incline to the side of the vehicle as illustrated in FIG. 1. However, if the boresight direction of the antenna is set to incline to the side of the vehicle, it may have an adverse effect on side and rear detection (for example, detection of a rear vehicle on a side lane), which may cause the most dangerous situation during driving.

Specifically, the radar may be subjected to a decrease in detecting distance and degradation in angle accuracy and angular resolution in a direction away from the boresight direction of the antenna. Therefore, as the boresight direction of the antenna is set to incline toward the side of the vehicle, the risk of safety caused by degradation in performance may increase in the direction important for safety of the vehicle.

SUMMARY

The present disclosure provides a waveguide antenna that is a single component configured to transmit and receive electromagnetic waves in different boresight directions independently of each other.

The present disclosure provides a waveguide antenna that is mounted on a vehicle such as a vehicle and configured to effectively eliminate blind zones of the vehicle, and a radar apparatus including the waveguide antenna.

The problems to be solved by the present disclosure are not limited to the above-described problems. There may be other problems to be solved by the present disclosure.

According to an exemplary embodiment, a waveguide antenna may include a base part including an accommodation portion that accommodates an integrated circuit and configured to separate an output of the integrated circuit into a first electromagnetic wave and a second electromagnetic wave having different frequencies from each other; a waveguide part provided on the base part and including a first waveguide and a second waveguide that guide the first electromagnetic wave and the second electromagnetic wave in different directions; and a cover part provided to cover at least a part of the waveguide part and including a first directional surface to which the first electromagnetic wave is radiated and a second directional surface to which the second electromagnetic wave is radiated.

According to another exemplary embodiment, a radar apparatus that is capable of being mounted on a side and rear corner of a vehicle and may include an integrated circuit; and an antenna module that includes a waveguide antenna including: a base part having an accommodation portion that accommodates the integrated circuit and configured to separate an output of the integrated circuit into a first electromagnetic wave and a second electromagnetic wave having different frequencies from each other; a waveguide part provided on the base part and having a first waveguide and a second waveguide that guide the first electromagnetic wave and the second electromagnetic wave in different directions; and a cover part provided to cover at least a part of the waveguide part and having a first directional surface to which the first electromagnetic wave is radiated and a second directional surface to which the second electromagnetic wave is radiated, and the integrated circuit and is mounted on a side and rear corner of a vehicle; a control module configured to generate information about objects around the vehicle based on signals detected by the antenna module; and a power management module configured to supply power to at least one of the antenna module and the control module, wherein the waveguide antenna is configured such that the first directional surface faces the rear of the vehicle and the second directional surface faces the side of the vehicle.

This summary is provided by way of illustration only and should not be construed as limiting in any manner. Besides the above-described exemplary embodiments, there may be additional exemplary embodiments that become apparent by reference to the drawings and the detailed description that follows.

According to the present disclosure, a single waveguide antenna can radiate electromagnetic waves to a first directional surface and a second directional surface so as to have different boresight directions from each other and can independently drive first and second electromagnetic waves separated from each other.

Further, a waveguide antenna mounted on a corner of a vehicle can operate toward the side and rear of the vehicle. Therefore, it is possible to effectively eliminate blind zones of the vehicle without an addition of a waveguide antenna to a separate location. Furthermore, the first and second electromagnetic waves can be driven in suitable manners for the side and the rear, respectively, of the vehicle. Therefore, it is possible to further secure safety and efficiency.

BRIEF DESCRIPTION OF THE DRAWINGS

In the detailed description that follows, embodiments are described as illustrations only since various changes and modifications will become apparent to a person with ordinary skill in the art from the following detailed description. The use of the same reference numbers in different figures indicates similar or identical items.

DETAILED DESCRIPTION

Figure 1:
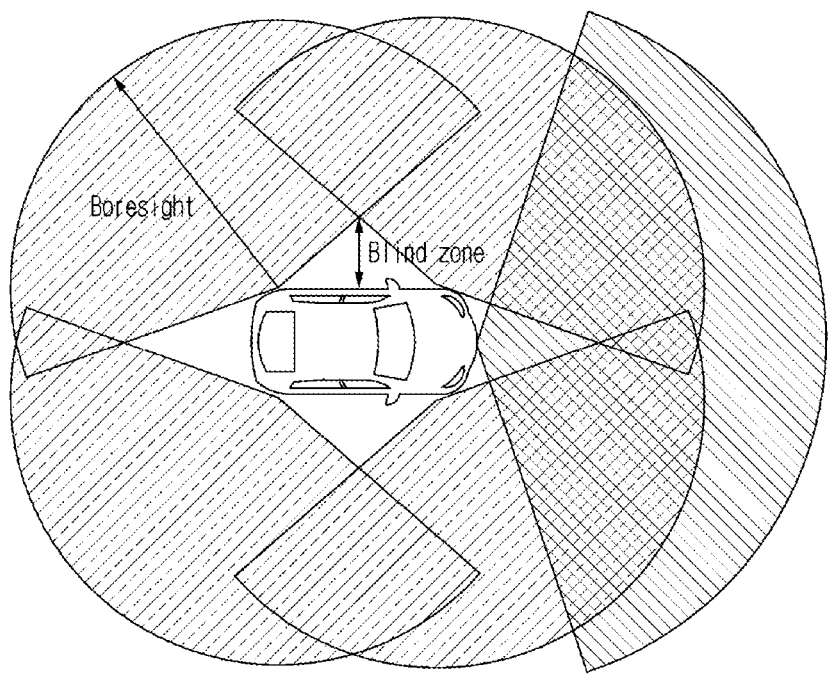
FIG. 1 is a diagram illustrating a conventional radar system built in a vehicle for omnidirectional monitoring.

Hereafter, example embodiments will be described in detail with reference to the accompanying drawings so that the present disclosure may be readily implemented by those skilled in the art. However, it is to be noted that the present disclosure is not limited to the example embodiments but can be embodied in various other ways. In the drawings, parts irrelevant to the description are omitted for the simplicity of explanation, and like reference numerals denote like parts through the whole document.

Throughout this document, the term "connected to" may be used to designate a connection or coupling of one element to another element and includes both an element being "directly connected" another element and an element being "electronically connected" to another element via another element. Further, it is to be understood that the terms "comprises," "includes," "comprising," and/or "including" means that one or more other components, steps, operations, and/or elements are not excluded from the described and recited systems, devices, apparatuses, and methods unless context dictates otherwise; and is not intended to preclude the possibility that one or more other components, steps, operations, parts, or combinations thereof may exist or may be added.

Throughout this document, when a member is said to be located "on" another member, this includes not only when the member is in contact with another member, but also when other member is present between the two members.

Throughout this document, the term "unit" may refer to a unit implemented by hardware, software, and/or a combination thereof. As examples only, one unit may be implemented by two or more pieces of hardware or two or more units may be implemented by one piece of hardware.

Throughout this document, a part of an operation or function described as being carried out by a terminal or device may be implemented or executed by a device connected to the terminal or device. Likewise, a part of an operation or function described as being implemented or executed by a device may be so implemented or executed by a terminal or device connected to the device.

Hereinafter, embodiments of the present disclosure will be explained in detail with reference to the accompanying drawings.

Figure 2:
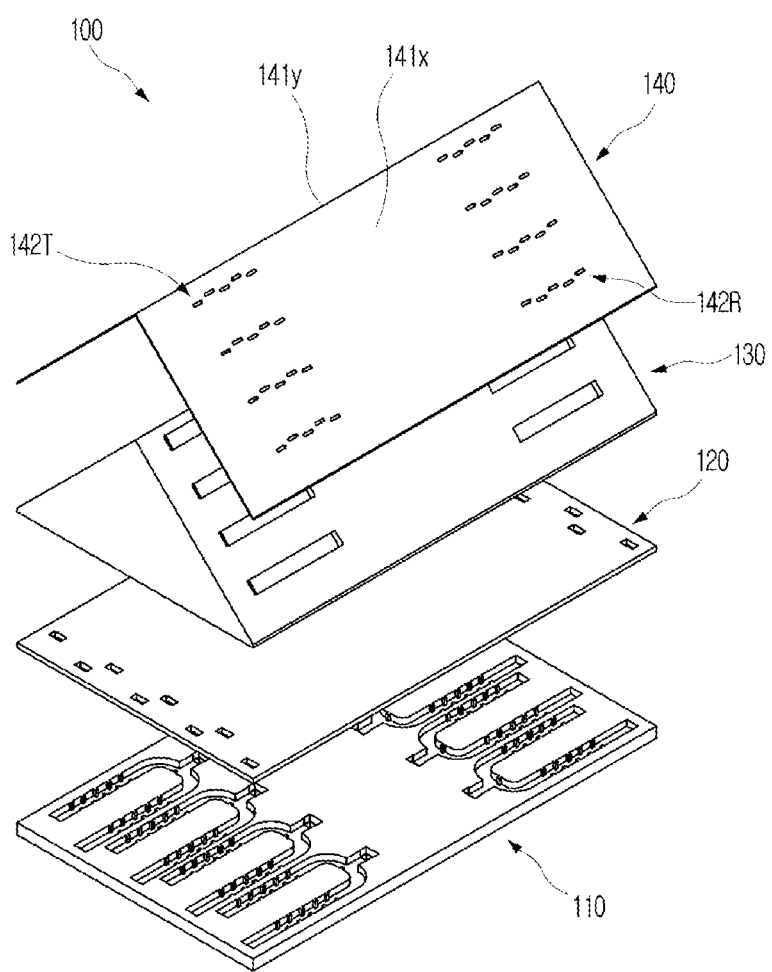
FIG. 2 is an exploded perspective view of a waveguide antenna according to an embodiment of the present disclosure.

FIG. 2 is an exploded perspective view of a waveguide antenna 100 according to an embodiment of the present disclosure. Referring to FIG. 2, the waveguide antenna 100 according to an embodiment of the present disclosure may include a base part 110, a transition part 120, a waveguide part 130 and a cover part 140. The waveguide antenna 100 according to the present embodiment may be configured to transition and guide an output of an integrated circuit so as to be transmitted and received to and from a space to be detected. Herein, the integrated circuit may be a MMIC (Monolithic Microwave Integrated Circuit).

Figure 3:
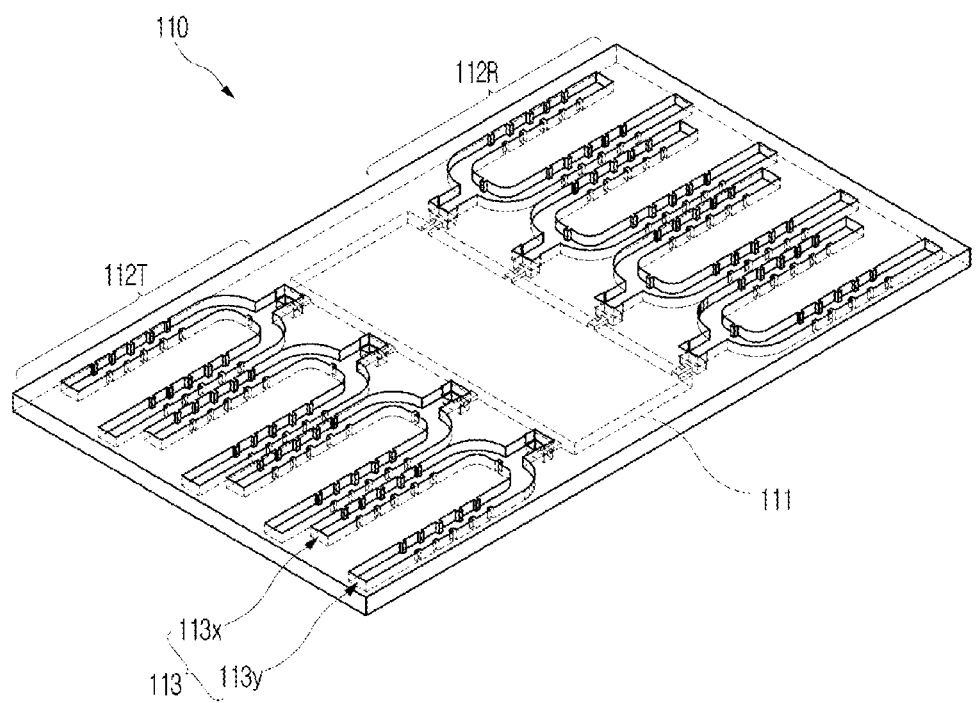
FIG. 3 is a diagram illustrating a base part of the waveguide antenna according to an embodiment of the present disclosure.
Figure 4:
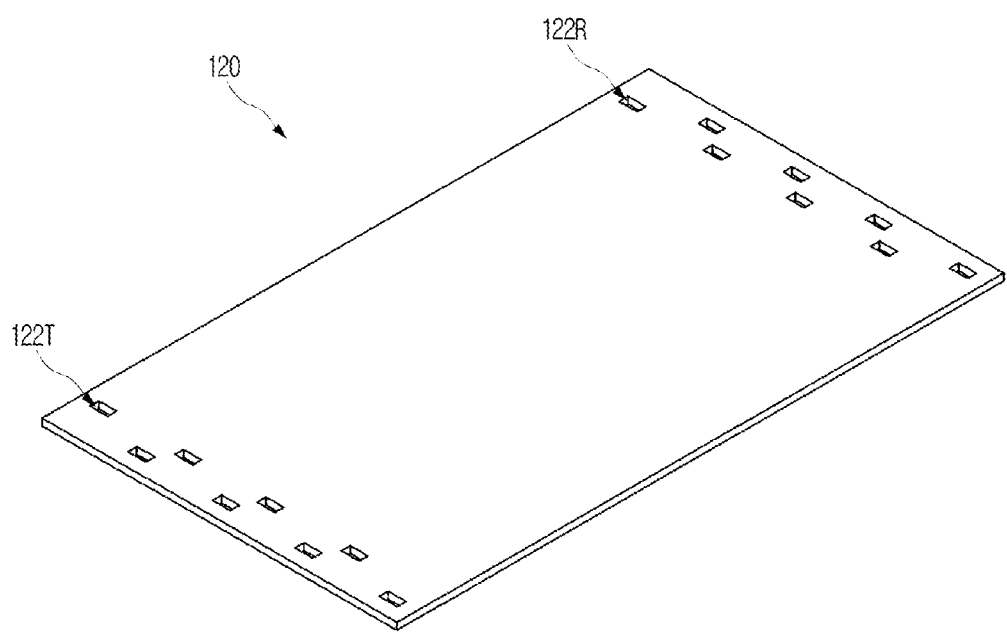
FIG. 4 is a diagram illustrating a transition part of the waveguide antenna according to an embodiment of the present disclosure.
Figure 5A:
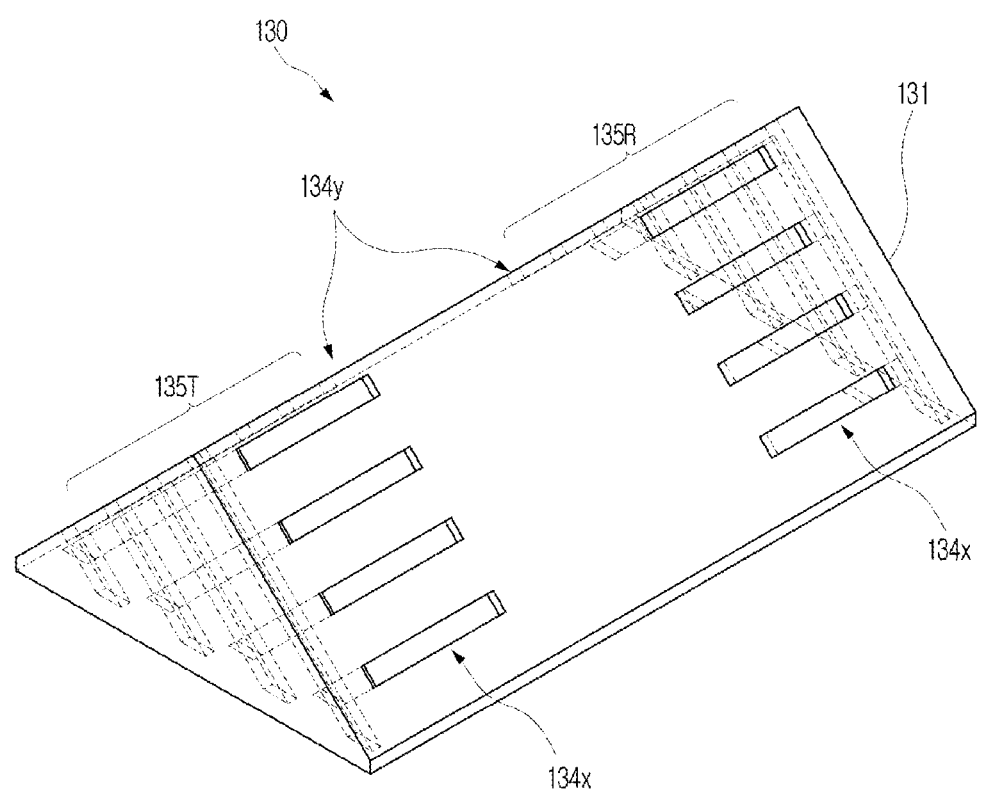
FIG. 5A and FIG. 5B are diagrams illustrating a waveguide part of the waveguide antenna according to an embodiment of the present disclosure.
Figure 5B:
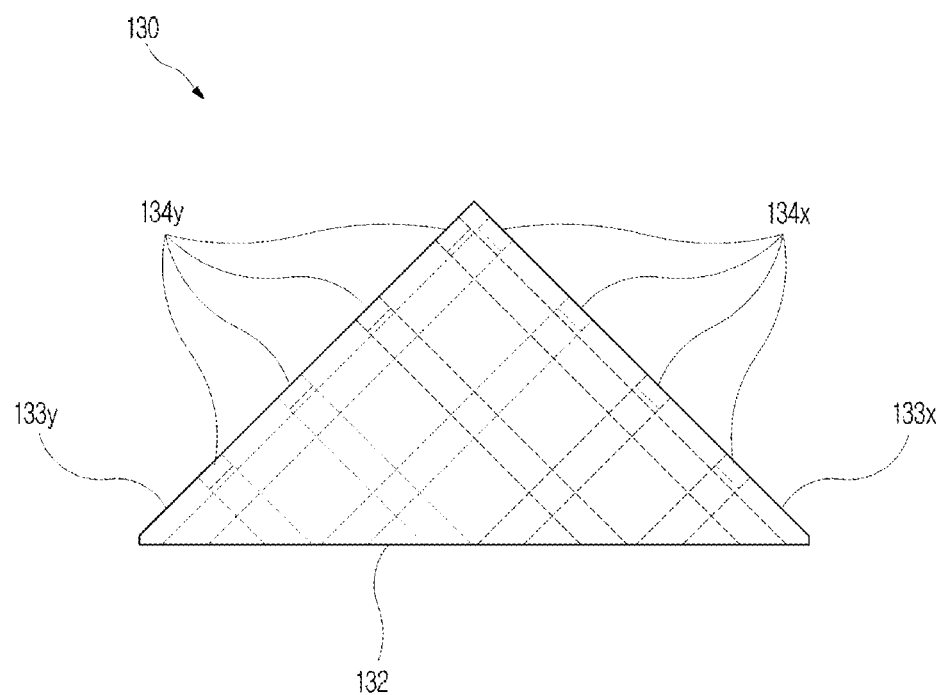

FIG. 3 is a diagram illustrating the base part 110 of the waveguide antenna 100 according to an embodiment of the present disclosure. Also, FIG. 4 is a diagram illustrating the transition part 120 of the waveguide antenna 100 according to an embodiment of the present disclosure. FIG. 5A and FIG. 5B are diagrams illustrating the waveguide part 130 of the waveguide antenna 100 according to an embodiment of the present disclosure.

Referring to FIG. 3, the base part 110 according to the present embodiment may have a plate shape, and may include an accommodation portion 111, a transmission base 112T and a reception base 112R. The accommodation portion 111 may be groove formed in a part of the plate, and the integrated circuit may be settled or fixed at the accommodation portion 111.

The transmission base 112T may be formed on one side of the accommodation portion 111, and may provide a path for transmission of electromagnetic waves. Also, the reception base 112R may be formed on another side of the accommodation portion 111, and may provide a path for reception of electromagnetic waves. As shown in FIG. 3, the transmission base 112T and the reception base 112R may be on both sides apart from the accommodation portion 111.

The base part 110 according to the present embodiment may be configured to separate the output of the integrated circuit into first and second electromagnetic waves having different frequencies from each other. In this regard, the base part 110 may further include a frequency filter 113.

Specifically, the frequency filter 113 may be formed in each of the transmission base 112T and the reception base 112R. A first frequency filter 113x may separate the first electromagnetic wave by allowing only the electromagnetic wave having a first frequency range to pass through, and a second frequency filter 113y may separate the second electromagnetic wave by allowing only the electromagnetic wave having a second frequency range to pass through. As shown in FIG. 3, the first frequency filter 113x and the second frequency filter 113y may be respectively provided on two paths branched off at an output port of the integrated circuit.

Referring to FIG. 2 and FIG. 4, the transition part 120 according to the present embodiment may be provided between the base part 110 and the waveguide part 130. The transition part 120 may be configured to cover and protect at least a part of the base part 110. The transition part 120 may connect the base part 110 and the waveguide part 130 to suppress loss of signal output from the integrated circuit and perform transition.

As shown in FIG. 4, a transmission through hole 122T and a reception through hole 122R may be formed in the transition part 120. The transmission through hole 122T and the reception through hole 122R may be formed on the above-described the transmission base 112T and reception base 112R, respectively, of the base part 110.

In an embodiment of the present disclosure, the waveguide part 130 may be provided on the base part 110 and the transition part 120 to guide the first electromagnetic wave and the second electromagnetic wave in different directions. Referring to FIG. 5A and FIG. 5B, the waveguide part 130 according to the present embodiment may include a main body 131, a base surface 132, a first electromagnetic wave surface 133x and a second electromagnetic wave surface 133y.

A first waveguide 134x and a second waveguide 134y may be formed in the main body 131. The first waveguide 134x may guide the first electromagnetic wave, and the second waveguide 134y may guide the second electromagnetic wave. In the present embodiment, the first waveguide 134x and the second waveguide 134y may respectively guide the first electromagnetic wave and the second electromagnetic wave in different directions from each other through routes independent of each other.

Referring to FIG. 5B, the base surface 132 may be formed on a first side of the main body 131 to face the above-described base part 110. The first electromagnetic wave and the second electromagnetic wave may be transferred from the base part 110 and the transition part 120 to the base surface 132 of the waveguide part 130.

In the present embodiment, the first electromagnetic wave surface 133x may be formed on a second side of the main body 131, and the second electromagnetic wave surface 133y may be formed on a third side of the main body 131. The first electromagnetic wave guided by the first waveguide 134x may reach the first electromagnetic wave surface 133x, and the second electromagnetic wave guided by the second waveguide 134y may reach the second electromagnetic wave surface 133y.

The first electromagnetic wave surface 133x may be provided to face a first directional surface 141x of the cover part 140, and the second electromagnetic wave surface 133y may be provided to face a second directional surface 141y of the cover part 140.

More specifically, the main body 131 according to the present embodiment may have a triangular prism shape including the base surface 132, the first electromagnetic wave surface 133x and the second electromagnetic wave surface 133y as side surfaces and extended in a longitudinal direction. Further, a path for transmission of electromagnetic waves and a path for reception of electromagnetic waves may be spaced apart from each other on both sides of the longitudinal direction of the extended main body 131.

That is, as shown in FIG. 5A, a transmission guide portion 135T including a transmission path for the first waveguide 134x and the second waveguide 134y may be provided on one side of the longitudinal direction of the main body 131, and a reception guide portion 135R including a reception path for the first waveguide 134x and the second waveguide 134y may be provided on another side of the longitudinal direction of the main body 131.

Referring back to FIG. 2, the cover part 140 may have the first directional surface 141x and the second directional surface 141y, and may be provided to cover at least a part of the waveguide part 130, specifically, the first electromagnetic wave surface 133x and the second electromagnetic wave surface 133y.

The first electromagnetic wave separated at the base part 110 may pass through the transition part 120 and the first waveguide 134x of the waveguide part 130 and may be radiated from the waveguide antenna 100 according to the present embodiment by using the first directional surface 141x as a radiation surface. Likewise, the second electromagnetic wave separated at the base part 110 may pass through the transition part 120 and the second waveguide 134y of the waveguide part 130 and may be radiated to the outside by using the second directional surface 141y as a radiation surface.

In an embodiment of the present disclosure, the first directional surface 141x and the second directional surface 141y of the cover part 140 may be connected to each other at a predetermined angle. Specifically, the first directional surface 141x and the second directional surface 141y of the cover part 140 may be connected to each other to form an angle of from 60° to 100° (as another example, an angle of 90°). The first electromagnetic wave and the second electromagnetic wave may be radiated at a predetermined angle in different directions from each other. That is, the first electromagnetic wave and second electromagnetic wave may be radiated at a predetermined angle in different directions from each other through the first directional surface 141x and the second directional surface 141y of the cover part 140 which are designed to form the predetermined angle. To this end, the first electromagnetic wave surface 133x and the second electromagnetic wave surface 133y of the waveguide part 130 may also be designed to form the predetermined angle.

Further, the cover part 140 may be formed such that each of the first directional surface 141x and the second directional surface 141y is extended in a longitudinal direction. A transmission slot 142T for transmission of the first electromagnetic wave may be formed on one side of the longitudinal direction of the first directional surface 141x, and a reception slot 142R for reception of the first electromagnetic wave may be formed on another side of the longitudinal direction of the first directional surface 141x.

Likewise, a transmission slot 142T for transmission of the second electromagnetic wave may be formed on one side of the longitudinal direction of the second directional surface 141y, and a reception slot 142R for reception of the second electromagnetic wave may be formed on another side of the longitudinal direction of the second directional surface 141y. Since the first electromagnetic wave and the second electromagnetic wave have different frequencies from each other, the slot formed in the first directional surface 141x may have a different structure, for example, different size, from the slot formed in the second directional surface 141y.

Meanwhile, in the present embodiment, the first electromagnetic wave and the second electromagnetic wave may be transmitted and received in different boresight directions from each other and their signals may be operated independently of each other. Specifically, the first electromagnetic wave and the second electromagnetic wave may be transmitted/received at different times from each other, for example, alternately on a predetermined cycle. Also, the first electromagnetic wave and the second electromagnetic wave may have waveforms with orthogonal polarization, and, thus, their mutual influence can be minimized. Further, the first electromagnetic wave and the second electromagnetic wave may be configured to have different bandwidths from each other.

Figure 6:
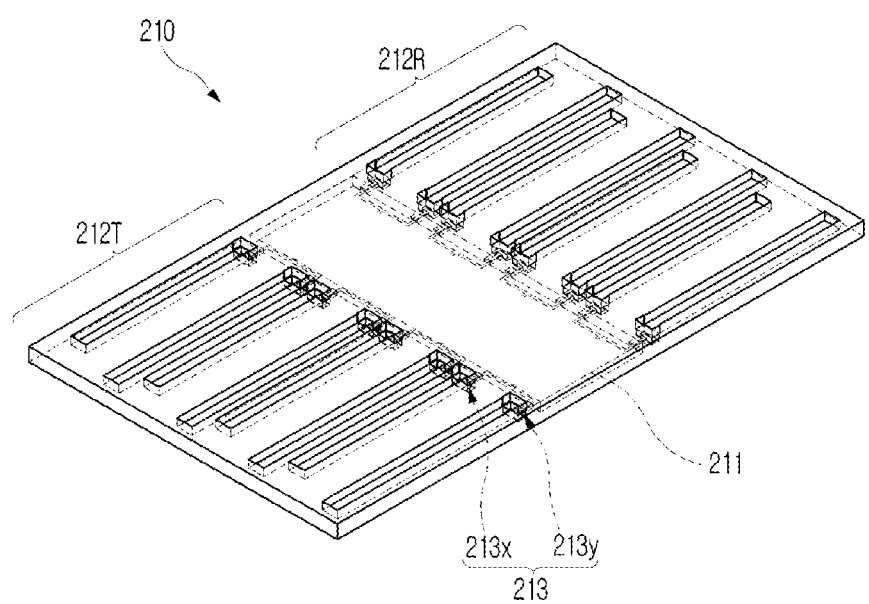
FIG. 6 is a diagram illustrating a base part of a waveguide antenna according to another embodiment of the present disclosure.

FIG. 6 is a diagram illustrating a base part 210 of a waveguide antenna 200 according to another embodiment of the present disclosure. A configuration of the base part 210 according to another embodiment of the present disclosure will be described with reference to FIG. 6.

In another embodiment of the present disclosure, the base part 210 may separate the frequencies of the first electromagnetic wave and the second electromagnetic wave by PCB transition and may apply them to the first waveguide 134x and the second waveguide 134y, respectively. The base part 210 may include a transmission base 212T and a reception base 212R on both sides of an accommodation portion 211. The base part 210 may further include a transition circuit 213 connected to an integrated circuit of the accommodation portion 211. A first transition circuit 213x may separate a first electromagnetic wave, and a second transition circuit 213y may separate a second electromagnetic wave having a different frequency from the first electromagnetic wave.

The waveguide antenna 100 according to an embodiment of the present disclosure has a common waveguide structure configured to transmit and receive a plurality of electromagnetic waves having different boresight directions from each other. Therefore, an area that can be detected by the waveguide antenna 100 may increase, and an efficient and simplified system can be configured without increasing complexity such as adding an antenna.

Figure 7:
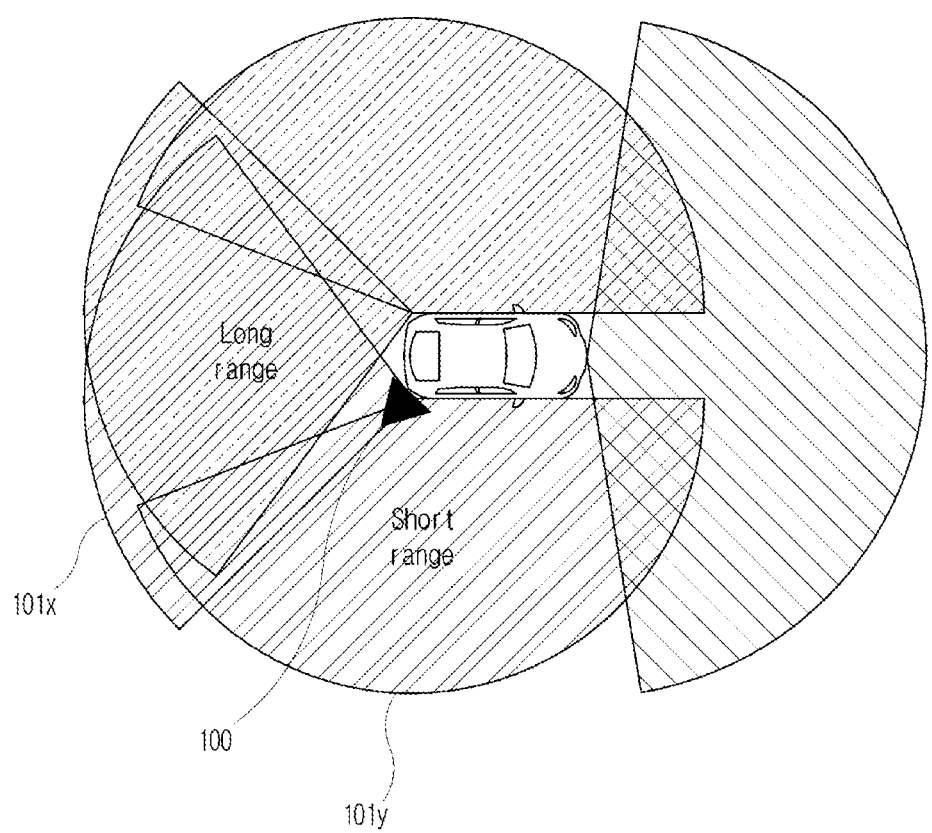
FIG. 7 is a diagram illustrating an example where a radar apparatus according to yet another embodiment of the present disclosure is mounted on a vehicle.
Figure 8:
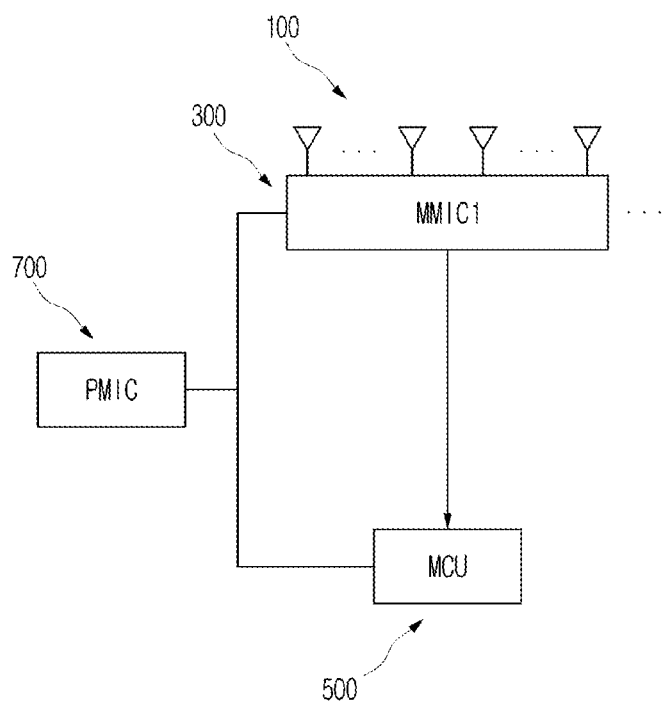
FIG. 8 is a diagram illustrating a configuration of the radar apparatus according to yet another embodiment of the present disclosure.

FIG. 7 is a diagram illustrating an example where a radar apparatus according to yet another embodiment of the present disclosure is mounted on a vehicle, and FIG. 8 is a diagram illustrating a configuration of the radar apparatus according to yet another embodiment of the present disclosure.

The radar apparatus according to yet another embodiment of the present disclosure may be mounted on a vehicle such as a vehicle, and may include the above-described waveguide antenna 100 according to an embodiment and another embodiment of the present disclosure.

As shown in FIG. 8, the radar apparatus may include an antenna module 100 and 300, a control module 500 and a power management module 700. The antenna module may include the waveguide antenna 100 and an integrated circuit 300 mounted on the waveguide antenna 100. As shown in FIG. 7, a plurality of antenna modules each including the waveguide antenna 100 may be mounted on the side and rear corners of the vehicle.

The control module (MCU: Micro Controller Unit) 500 may generate and process information about objects or topography around the vehicle based on signals detected by the antenna modules. The plurality of antenna modules, i.e., the antenna modules mounted on the side and rear corners, may be connected to the control module 500 and may be further connected to an additional antenna or integrated circuit.

The power management module (PMIC: Power management integrated circuit) 700 may be connected to at least one of the antenna module and the control module 500 to supply power thereto.

In the present embodiment, the waveguide antenna 100 of the antenna module may be configured such that the first directional surface 141x faces the rear of the vehicle and the second directional surface 141y faces the side of the vehicle.

For example, as shown in FIG. 7, the waveguide antenna 100 may be provided such that a longitudinal direction at one corner corresponds to the vertical direction of a vehicle. Accordingly, a first electromagnetic wave 101x having a boresight direction set to the rear and a second electromagnetic wave 101y having a boresight direction set to the side may be transmitted and received by the single waveguide antenna 100.

Furthermore, in the radar apparatus according to the present embodiment, the first electromagnetic wave 101x may be configured to detect information from farther distances from the vehicle than the second electromagnetic wave 101y. To this end, the first electromagnetic wave 101x may be configured to have a smaller width in transmission and reception than the second electromagnetic wave 101y.

In the radar apparatus according to the present embodiment, the waveguide antenna 100 mounted on a corner of the vehicle can operate toward the side and rear of the vehicle. As shown in FIG. 7, blind zones of the vehicle can be effectively eliminated without an addition of an antenna to a separate location. Further, the cost of a separate space for addition of an antenna to a separate location, a cable, a connector and a joint can be reduced and the limitations to the design of the vehicle can be eliminated.

Furthermore, in the radar apparatus according to the present embodiment, a plurality of electromagnetic waves can be driven independently of each other in suitable manners for the side and the rear, respectively, of the vehicle. One of the plurality of electromagnetic waves may have a boresight direction set to the rear that is important for safety, and may have a narrow beam width to improve an antenna gain and detect far distances. Since the boresight direction is set to the rear of the vehicle, it is possible to suppress performance degradation and accuracy decrease of an antenna with respect to the rear of the vehicle and secure safety.

The above description of the present disclosure is provided for the purpose of illustration, and it would be understood by those skilled in the art that various changes and modifications may be made without changing technical conception and essential features of the present disclosure. Thus, it is clear that the above-described embodiments are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

What is claimed is:

1. A waveguide antenna, comprising:
   a base part including an accommodation portion that is accommodates an integrated circuit and configured to separate an output of the integrated circuit into a first electromagnetic wave and a second electromagnetic wave having different frequencies from each other;
   a waveguide part provided on the base part and including a first waveguide and a second waveguide that guide the first electromagnetic wave and the second electromagnetic wave in different directions; and
   a cover part provided to cover at least a part of the waveguide part and including a first directional surface to which the first electromagnetic wave is radiated and a second directional surface to which the second electromagnetic wave is radiated,
   wherein the waveguide part further includes:
   a main body in which the first waveguide and the second waveguide are formed, and
   wherein a transmission guide portion for the first waveguide and the second waveguide is formed on one side of the main body, and a reception guide portion for the first waveguide and the second waveguide is formed on another side of the main body.

2. The waveguide antenna of claim 1, further comprising:
a transition part located between the base part and the waveguide part and provided to cover at least a part of the base part.

3. The waveguide antenna of claim 1,
wherein the base part further includes:
a transmission base formed on one side of the accommodation portion and configured to transmit the first electromagnetic wave and the second electromagnetic wave; and
a reception base formed on another side of the accommodation portion and configured to receive the first electromagnetic wave and the second electromagnetic wave.

4. The waveguide antenna of claim 1,
wherein the waveguide part further includes:
a base surface formed on a first side of the main body to face the base part;
a first electromagnetic wave surface formed on a second side of the main body to face the first directional surface; and
a second electromagnetic wave surface formed on a third side of the main body to face the second directional surface.

5. The waveguide antenna of claim 4,
wherein the main body has a triangular prism shape including the base surface, the first electromagnetic wave surface and the second electromagnetic wave surface as side surfaces and extended in a longitudinal direction.

6. The waveguide antenna of claim 1,
wherein the first directional surface and the second directional surface of the cover part form an angle of from 60° to 100°.

7. The waveguide antenna of claim 1,
wherein each of the first directional surface and the second directional surface of the cover part is extended in a longitudinal direction,
a transmission slot for transmission of the first electromagnetic wave is formed on one side of the longitudinal direction of the first directional surface and a reception slot for reception of the first electromagnetic wave is formed on another side of the longitudinal direction of the first directional surface, and
a transmission slot for transmission of the second electromagnetic wave is formed on one side of the longitudinal direction of the second directional surface and a reception slot for reception of the second electromagnetic wave is formed on another side of the longitudinal direction of the second directional surface.

8. The waveguide antenna of claim 1,
wherein the base part further includes a frequency filter that separates the first electromagnetic wave or the second electromagnetic wave.

9. The waveguide antenna of claim 1,
wherein the first electromagnetic wave and the second electromagnetic wave separated from each other are transmitted/received at different times from each other, or are configured to have orthogonal polarization or are configured to have different bandwidths from each other.

10. A radar apparatus, comprising:
an antenna module that is capable of being mounted on a side and rear corner of a vehicle and includes:
an integrated circuit; and
a waveguide antenna including: a base part having an accommodation portion that accommodates the integrated circuit and configured to separate an output of the integrated circuit into a first electromagnetic wave and a second electromagnetic wave having different frequencies from each other; a waveguide part provided on the base part and having a first waveguide and a second waveguide that guide the first electromagnetic wave and the second electromagnetic wave in different directions; and a cover part provided to cover at least a part of the waveguide part and having a first directional surface to which the first electromagnetic wave is radiated and a second directional surface to which the second electromagnetic wave is radiated,
a control module configured to generate information about objects around the vehicle based on signals detected by the antenna module; and
a power management module configured to supply power to at least one of the antenna module and the control module,
wherein the waveguide antenna is configured such that the first directional surface faces the rear of the vehicle and the second directional surface faces the side of the vehicle,
wherein the waveguide part further includes:
a main body in which the first waveguide and the second waveguide are formed, and
wherein a transmission guide portion for the first waveguide and the second waveguide is formed on one side of the main body, and a reception guide portion for the first waveguide and the second waveguide is formed on another side of the main body.

11. The radar apparatus of claim 10,
wherein the first electromagnetic wave is configured to have a smaller width in transmission and reception than the second electromagnetic wave such that the first electromagnetic wave detects information from farther distances from the vehicle than the second electromagnetic wave.

* * * * *